United States Patent [19]
Walton

[11] Patent Number: 5,222,849
[45] Date of Patent: Jun. 29, 1993

[54] LOAD INDICATING FASTENERS

[75] Inventor: Brian Walton, Dudley, England

[73] Assignee: Rotabolt Limited, United Kingdom

[21] Appl. No.: 844,717

[22] Filed: Mar. 2, 1992

[30] Foreign Application Priority Data

Feb. 10, 1992 [GB] United Kingdom ............... 9202771

[51] Int. Cl.$^5$ ............................................. F16B 31/12
[52] U.S. Cl. ........................................... 411/14; 411/9
[58] Field of Search .................... 411/1, 6, 7, 14, 8, 411/383, 385, 916

[56] References Cited

U.S. PATENT DOCUMENTS

| | | |
|---|---|---|
| 2,413,797 | 1/1947 | Stone . |
| 3,248,923 | 5/1966 | Blakeley .................................... 73/1 |
| 3,283,567 | 11/1966 | Fietz ................................. 411/14 X |
| 3,881,392 | 5/1975 | Curtis . |
| 4,525,114 | 6/1985 | Hirst ........................................ 411/9 |
| 4,904,132 | 2/1990 | Popenoe ........................... 411/14 X |
| 4,981,404 | 1/1991 | Chamberlain et al. ................ 411/14 |

FOREIGN PATENT DOCUMENTS

WO9108398  6/1991  PCT Int'l Appl. .

*Primary Examiner*—Rodney M. Lindsey
*Attorney, Agent, or Firm*—Kirschstein, Ottinger, Israel & Schiffmiller

[57] ABSTRACT

A load-indicating fastener, such as a bolt (10), has a bore (18) which extends from an end face (16) of the bolt and which can receive a gauge pin (30). The gauge pin (30) is free to rotate so that it can be withdrawn completely from the bolt. In use of the bolt, the gauge pin (30) is reinserted into the bore (18) and screwed down until the end of the pin engages the inner end of the bore. As the bolt is tightened, causing elongation of the shank (12) of the bolt (10) and therefore of the bore (18), the user can check the loading on the bolt by periodically rotating the gauge pin (30), to maintain contact between the end of the pin and the inner end of the bore, until the pointer (40) reaches the mark (28) on the end face (16) of the bolt, indicating that the predetermined loading has been reached.

8 Claims, 1 Drawing Sheet

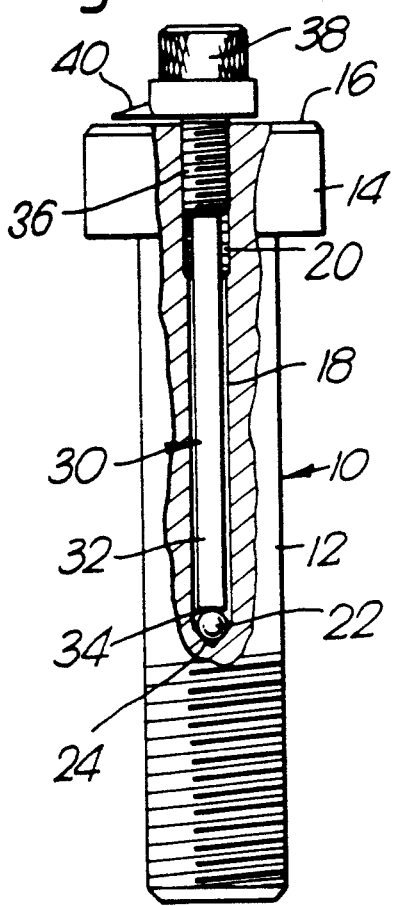
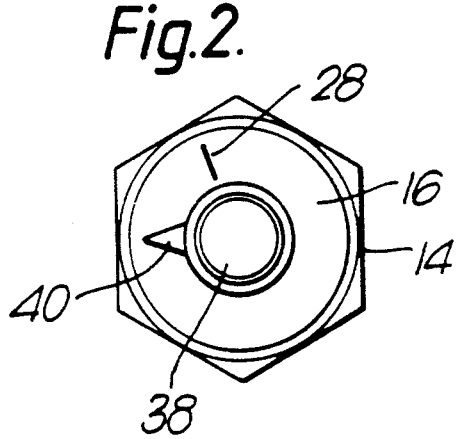
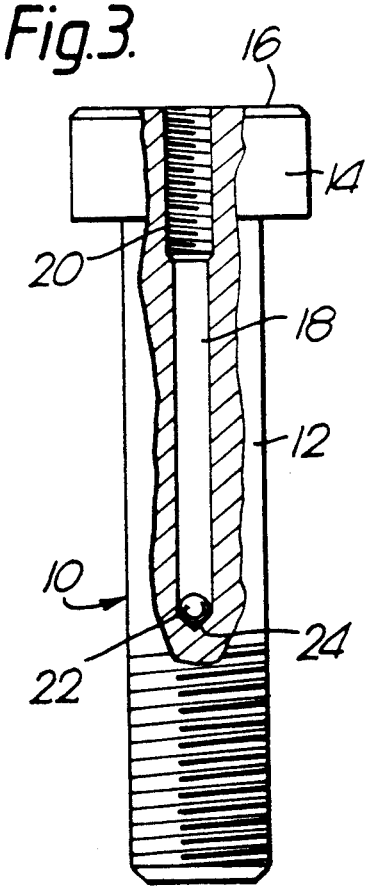
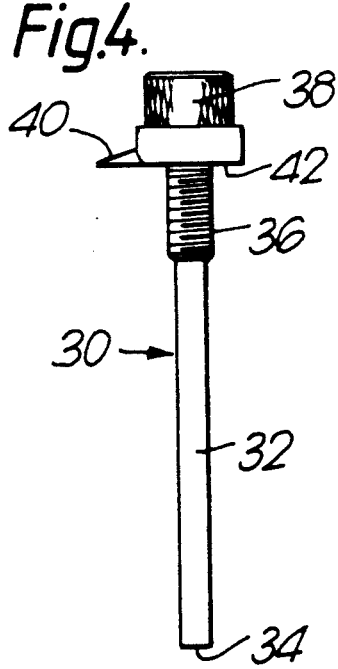

LOAD INDICATING FASTENERS

BACKGROUND OF THE INVENTION

Field of the Invention

This invention relates to load indicating fasteners.

Description of Related Art

The invention relates in particular to fasteners, such as bolts or studs, which in use are subject to tensile loading. It is often important to ensure that the fastener is tightened to a predetermined loading. It is known to use the stretching of the fastener which occurs under tensile loading to give an indication when the appropriate loading has been reached.

U.S. Pat. No. 4,981,404 (Arrow Support Systems) describes a bolt having an axial cavity extending inwards from an end face of the bolt, the axial cavity having an upper portion with internal threads and a lower portion extending from the internal threads to the bottom of the cavity, and a gauging pin with external threads engaging the internal threads of the axial cavity and an unthreaded portion of the pin extending to the end of the cavity. The gauging pin has a portion which extends outwards beyond the end face of the bolt and terminates in a head having a pointer extending radially outwards above the face of the bolt, providing a load indicator assembly. The assembly is factory-set by applying a predetermined tensile load to the bolt, screwing down the gauging pin until its end engages the bottom of the cavity, marking the position of the pointer on the end face of the bolt and releasing the bolt from tension. On release of the tension, the bolt regains its original length, and the portion of the gauging pin between the threaded connection with the cavity and the end of the cavity is elastically compressed so that the pin is held against rotation. The bolt is then shipped to the user. In use, when the tension applied to the bolt reaches the predetermined level, the compression on the pin is released and the pin is free to move in the direction of a lower stress level, indicating that the predetermined load has been reached. If the load is increased further, the cavity is further elongated, allowing the gauging pin to be turned beyond the mark on the face of the bolt, in the direction of a higher stress level. A pin set into the end face of the bolt is positioned to engage the pointer of the gauging pin, to prevent the gauging pin moving more than 180° to either side of the mark on the end face indicating the predetermined loading.

The bolt of the U.S. patent therefore provides an indicator assembly which shows when the predetermined loading has been reached, and also shows if the predetermined loading has been exceeded. A disadvantage with the bolt of the U.S. patent is that the gauging pin, being under compression when the bolt is shipped to the user, may, particularly if the bolt is kept in storage for a relatively long period between its factory setting and its use, become bedded into the cavity. This means that, when an increasing tensile load is applied to the bolt in use, the pin will be relieved from compression before the tensile loading reaches the predetermined level, and when the loading is at the predetermined level, the indicator will give a false indication that the level has been exceeded. A further disadvantage is the cost involved in providing a gauging pin for each bolt.

SUMMARY OF THE INVENTION

It is an object of the present invention to provide an improved load indicating fastener.

The present invention consists in a load indicating fastener comprising a body having shank which is subject to tensile loading in use, the body having a bore which extends axially from an end face of the body into the shank and which is adapted to receive a gauge pin, the gauge pin having a threaded portion adapted to engage a complementary threaded portion of the bore so that rotation of the gauge pin effects axial movement between the gauge pin and the body of the fastener, the threaded portion of the gauge pin being spread form a part of the gauge pin which is adapted to contact part of the body of the fastener to stop movement of the gauge pin as it is screwed into the body of the fastener, the gauge pin protruding outwards beyond the end face of the fastener and having a head by which the pin can be rotated, and markings being provided on the head and the end face of the fastener to indicate the position of the gauge pin when the said part of the pin is in contact with the said part of the bore when the shank of the fastener is subject to a predetermined tensile loading, the gauge pin being free to rotate so that the gauge pin can be withdrawn from the fastener by rotating the pin to release the engagement between the threaded portion of the pin and the complementary threaded portion of the bore.

Preferably, the threaded portion of the bore is positioned near the end face of the fastener and the threaded portion of the gauge pin is spaced from the inner end of the gauge pin, so that as the gauge pin is screwed into the body of the fastener rotation of the gauge pin is stopped when the end of the gauge pin contacts the inner end of the bore, the markings on the head and the end face of the fastener indicating the position of the gauge pin when the end of the pin is in contact with the inner end of the bore when the shank of the fastener is subject to the said predetermined tensile loading.

In use, the fastener is factory-set by applying a predetermined tensile load to the shank of the fastener, rotating the gauge pin until the end of the pin contacts the inner end of the bore, marking the end face of the fastener and/or the head to provide the said markings, rotating the pin to withdraw the end of the pin from the inner end of the bore and releasing the load on the shank. The fastener can then be shipped to the user.

Preferably, the pin is withdrawn from the bore before the fastener is shipped to the user. The end of the bore may then be closed by a suitable plug or cap.

The user can then store the fastener without any risk of the pin bedding into the bore in the fastener. When the fastener is used, the gauge pin is reinserted into the bore and screwed down until the end of the pin contacts the inner end of the bore. As the fastener is tightened, the increased tensile loading causes elongation of the fastener and therefore of the bore, so that the end of the gauge pin is moved away from the inner end of the bore. The gauge pin is therefore free to rotate further in the sense causing the end of the pin to move towards the end of the bore. The user can therefore check the tensile loading by periodically rotating the gauge pin, to maintain contact between the end of the pin and the inner end of the bore, until the markings on the head of the pin and the end face of the fastener indicate that the predetermined tensile loading has been reached. The markings will thus give an indication of the increased tensile loading as the loading increases toward the predetermined level, and will also indicate if the predetermined loading has been exceeded. After the predetermined loading has been reached, the user may withdraw the gauge pin from the fastener and reinsert the plug or cap closing the bore. The gauge pin can then retained, to enable the loading on the fastener to be checked at any time, by reinserting the gauge pin in the bore and screwing it down until the end of the pin contacts the inner end of the bore, so that the markings on the end face of the bore and the head of the pin will show whether the tensile loading is still at the required level.

In accordance with the preferred feature of the invention, a number of fasteners may be preset using the same gauge pin, so that a set of fasteners can be supplied together with a single gauge pin, thus reducing the cost of supplying the set of fasteners. The user can then use the gauge pin with each of the fasteners as it is installed and subsequently to check the loading of each fastener. Instead of a single gauge pin, two or more identical gauge pins could be provided with the set of fasteners, for example to enable the user to keep one or more pins as spares.

In accordance with a preferred feature of the invention, a rigid ball, for example, of steel, is positioned between the end of the gauge pin and the inner end of the bore in the fastener, to ensure that there is a single-point contact between the end of the pin and the fastener. The ball may be secured in the bore, for example, by use of a suitable adhesive.

Preferably, the markings on the head of the gauge pin and the end face of the fastener comprise a pointer on the head of the pin projecting above the end face of the fastener. Then, in factory-setting the fastener, it is necessary only to make a mark on the end face of the fastener showing the position of the pointer at the predetermined load.

In an alternative form of the invention, the threaded portion of the gauge pin is located at the inner end of the pin and is adapted to engage a threaded portion at or near the inner end of the bore in the fastener, and movement of the gauge pin as it is screwed into the fastener is stopped by contact of the underside of the head of the gauge pin with the ned face of the fastener. In this case, the bore is made sufficiently long in relation to the gauge pin to avoid the end of the pin contacting the inner end of the bore.

BRIEF DESCRIPTION OF THE DRAWINGS

The invention will now be described, by way of example, with reference to the accompanying drawings, in which:

FIG. 1 is a side elevation, partly in cross-section, of a bolt in accordance with the invention, with the gauge pin in position in the bolt;

FIG. 2 is a plan view of the bolt with the gauge pin in position;

FIG. 3 is a side elevation of the bolt with the gauge pin withdrawn; and

FIG. 4 is a side elevation of the gauge pin.

DETAILED DESCRIPTION OF THE PREFERRED EMBODIMENT

Referring to the drawings, a bolt 10 has a shank 12 and a head 14. A bore 18 of uniform diameter extends from the end face 16 of the head, partway through the shank 12. The bore 18 is internally screw-threaded over a portion extending form the end face 16 of the bolt. A steel ball 22 is secured at the inner end 24 of the bore 18.

A gauge pin 30 has a cylindrical portion 32 of diameter slightly less than that of the bore 18. The inner end of the portion 32 has a flat end face 34. At is outer end the pin is secured to a knurled head 38. Between the head 38 and the cylindrical portion 32 is a cylindrical portion 36 formed with an external screw-thread which engages, when the pin is in position in the bolt, with the internal screw-thread 20 in the bolt. The head 38 is formed with a radially extending pointer 40.

The dimensions of the gauge pin 30 and the bore 18 in the bolt are such that, when the pin is positioned in the bore with its end face 34 engaging the ball 22 at the inner end of the bore 18, as shown in FIG. 1, the lower face 42 of the head 38 and the pointer 40 are spaced slightly from the end face 16 of the bolt. The spacing being sufficient to allow inward movement of the gauge pin when the bolt is subject to a tensile load, as described below, without the head of the pin coming into contact with the end face of the bolt.

A mark 28 on the end face 16 of the bolt is positioned so that the pointer 40 of the gauge pin is aligned with the mark 28 when the end of the gauge pin is in contact with the inner end of the bore 18, through the ball 22, and the shank 12 of the bolt is under a predetermined tensile loading equal to the desired loading of the bolt in use.

In order to set the assembly to the desired loading, the bolt is subject to the predetermined tensile load, and the gauge pin 30 is inserted into the bore 18 so that the threaded portion 36 engages the threaded portion 20 of the bore, and is rotated until the end of the pin 30 engages the ball 22. The mark 28 is then made on the end face 16, in alignment with the pointer 40. The pin 30 is then rotated in the opposite sense to move the end of the pin away from the end of the bore 18, and the load on the bolt released. The pin can then be withdrawn completely from the bolt and the end of the bore 18 closed with a suitable plug or cap. The bolt and gauge pin are then ready to be shipped to the user.

In use, when the bolt is installed, the user inserts the gauge pin 30 into the bore 18, and rotates the pin until the end of the pi contacts the inner end of the bore 18, through the ball 22. The position of the pointer 40 in relation to the mark 28 ill then indicate whether the tension applied to the bolt is below, equal to or above the predetermined loading. Thus, the indicator can be used to ensure that the bolt is tightened to the predetermined loading, and also, as the bolt is being tightened to give an indication as the predetermined loading is reached. After the bolt has been installed, the gauge pin can be withdrawn from the bolt and stored separately. The pin can subsequently be used to check whether the bolt has retained the predetermined loading.

Since it is necessary only to drill a uniform bore in the bolt, and to tap the outer portion of the bore, manufacture of the bolt in accordance with the invention, or modification of an existing bolt, is straight-forward and relatively inexpensive. The gauge pin can also be made relatively inexpensively. For example, the head and pointer of the gauge pin could be made from a sintered composite.

I claim:

1. A load indicating fastener comprising a body having a shank which is subject to tensile loading in use, the body having a bore which extends axially from an end face of the body into the shank and which is adapted to receive a gauge pin, the gauge pin having a threaded portion adapted to engage a complementary threaded portion of the bore so that rotation of the gauge pin effects axial movement between the gauge pin and the body of the fastener, the threaded portion of the gauge pin being spaced from a part of the gauge pin which is adapted to contact part of the body of the fastener to stop movement of the gauge pin as it is screwed into the body of the fastener, the gauge pin protruding outwards beyond the end face of the fastener and having a head by which the pin can be rotated, and markings being provided on the head and the end face of the fastener to indicate the position of the gauge pin when the said part of the pin is in contact with the said part of the bore when the shank of the fastener is subject to a predetermined tensile loading, the gauge pin being free to rotate so that the gauge pin can be withdrawn from the fastener by rotating the pin to release the engagement between the threaded portion of the pin and the complementary threaded portion of the bore.

2. A fastener as claimed in claim 1, in which the threaded portion of the bore is positioned near the end face of the fastener and the threaded portion of the gauge pin is spaced form the inner end of the gauge pin, so that as the gauge pin is screwed into the body of the fastener rotation of the gauge pin is stopped when the end of the gauge pin contacts the inner end of the bore, the markings on the head and the end face of the fastener indicating the position of the gauge pin when the end of the pin is in contact with the inner end of the bore when the shank of the fastener is subject to the said predetermined tensile loading.

3. A fastener as claimed in claim 2, in which the fastener is pre-set to provide an indication at the said predetermined tensile load by applying the predetermined tensile load to the shank of the fastener, rotating the gauge pin until the end of the pin contacts the inner end of the bore, marking the end face of the fastener and/or the head to provide the said markings, rotating the pin to withdraw the end of the pin form the inner end of the bore and releasing the load on the shank.

4. A fastener as claimed in claim 2 in which the markings on the head of the gauge pin and the end face of the fastener comprise a pointer on the head of the pin projecting above the end face of the fastener and a mark on the end face of the fastener.

5. A fastener as claimed in claim 2 in which the end of the gauge pin is substantially flat, and a rigid ball is positioned between the end of the gauge pin and the inner end of the bore in the fastener.

6. An assembly comprising a fastener and a gauge pin withdrawn from the fastener, said fastener including a body having a shank which is subject to tensile loading in use, the body having a bore which extends axially from an end face of the body into the shank and which is adapted to receive the gauge pin, the gauge pin having a threaded portion adapted to engage a complementary threaded portion of the bore so that rotation of the gauge pin effects axial movement between the gauge pin and the body of the fastener, the threaded portion of the gauge pin being spaced from a part of the gauge pin which is adapted to contact part of the body of the fastener to stop movement of the gauge pin as it is screwed into the body of the fastener, the gauge pin protruding outwards beyond the end face of the fastener and having a head by which the pin can be rotated, and markings being provided n the head and the end face of the fastener to indicate the position of the gauge pin when the said part of the pin is in contact with the said part of the bore when the shank of the fastener is subject to a predetermined tensile loading, the gauge pin being free to rotate s that the gauge pin can be withdrawn from the fastener by rotating the pin to release the engagement between the threaded portion of the pin and the complementary threaded portion of the bore.

7. An assembly comprising a plurality of fasteners and a single gauge pin common to all the fasteners, each fastener including a body having a shank which is subject to tensile loading in use, the body having a bore which extends axially form an end face of the body into the shank and which is adapted to receive the gauge pin, the gauge pin having a threaded portion adapted to engage a complementary threaded portion of the bore so that rotation of the gauge pin effects axial movement between the gauge pin and the body of the fastener, the threaded portion of the gauge pin being spaced from a part of the gauge pin which is adapted to contact part of the body of the fastener to stop movement of the gauge pin as it is screwed into the body of the fastener, the gauge pin protruding outwards beyond the end face of the fastener and having a head by which the pin can be rotated, and markings being provided on the head and the end face of the fastener to indicate the position of the gauge pin when the said part of the pin is in contact with the said part of the bore when the shank of the fastener is subject to a predetermined tensile loading, the gauge pin being free to rotate so that the gauge pin can be withdrawn from the fastener by rotating the pin to release the engagement between the threaded portion of the pin and the complementary threaded portion of the bore, each fastener having been pre-set, using the single gauge pin, to provide an indication at the predetermined tensile loading when the gauge pin is, in use, inserted into the bore in the fastener.

8. An assembly comprising a plurality of fasteners and a number of identical gauge pins, each fastener including a body having a shank which is subject to tensile loading in use, the body having a bore which extends axially from an end face of the body into the shank and which is adapted to receive a respective gauge pin, the gauge pin having a threaded portion adapted to engage a complementary threaded portion of the bore so that rotation of the gauge pin effects axial movement between the gauge pin and the body of the fastener, the threaded portion of the gauge pin being spaced from a part of the gauge pin which is adapted to contact part of the body of the fastener to stop movement of the gauge pin as it is screwed into the body of the fastener, the gauge pin protruding outwards beyond the end face of the fastener and having a head by which the pin can be rotated, and markings being provided on the head and the end face of the fastener to indicate the position of the gauge pin when the said part of the pin is in contact with the said part of the bore when the shank of the fastener is subject to a predetermined tensile loading, the gauge pin being free to rotate so that the gauge pin can be withdrawn from the fastener by rotating the pin to release the engagement between the threaded portion of the pin and the complementary threaded portion of the bore, each fastener having been pre-set, using one of the gauge pins, to provide an indication at the predetermined tensile loading when any of the gauge pin is, in use, inserted into the bore in the fastener.

* * * * *